United States Patent [19]

Oelke et al.

[11] 4,109,840

[45] Aug. 29, 1978

[54] METHOD OF AND APPARATUS FOR THERMALLY SEVERING GLASS

[75] Inventors: Waldemar W. Oelke, Rossford; Hans W. Boehm, Toledo; Richard A. Herrington, Walbridge, all of Ohio

[73] Assignee: Libbey-Owens-Ford Company, Toledo, Ohio

[21] Appl. No.: 677,977

[22] Filed: Apr. 19, 1976

[51] Int. Cl.² .................................................. B26F 3/08
[52] U.S. Cl. ........................................ 225/2; 225/93.5
[58] Field of Search ............................ 225/2, 93.5, 96; 65/112, 174

[56] References Cited

U.S. PATENT DOCUMENTS

| | | | |
|---|---|---|---|
| 1,744,045 | 1/1930 | Halbach | 65/112 |
| 1,774,644 | 10/1930 | Hitner | 225/93.5 |
| 2,169,687 | 8/1939 | Fowler et al. | 225/93.5 |
| 2,282,440 | 5/1942 | Turke | 225/93.5 |
| 2,283,251 | 5/1942 | Gunther | 65/174 |
| 2,310,403 | 2/1943 | Dice | 65/174 |
| 2,584,851 | 2/1952 | Dunipace | 225/93.5 X |
| 3,344,968 | 10/1967 | Kovacik et al. | 225/93.5 X |

FOREIGN PATENT DOCUMENTS 1,252,901  11/1971  United Kingdom ............... 65/112

Primary Examiner—Othell M. Simpson
Assistant Examiner—John Sipos
Attorney, Agent, or Firm—Collins, Oberlin & Darr

[57] ABSTRACT

A method of and apparatus for cutting relatively thick glass sheets by applying surface contact, conductive heat to the glass surface along the desired line of cut. An elongated, heated conductor rod is placed on the glass surface along the desired line of cut for transmitting heat thereto to create a thermal differential line and effect a cut therealong. Pressure means bear against the conductor rod to maintain the same in continuous contact throughout with the glass surface along the length of the desired line of cut.

4 Claims, 7 Drawing Figures

METHOD OF AND APPARATUS FOR THERMALLY SEVERING GLASS

BACKGROUND OF THE INVENTION

The present invention relates generally to glass cutting and, more particularly, to the thermal cutting of relatively thick glass plates or sheets.

Various attempts have been made to thermally cut glass plates or sheets in an effort to overcome the arduous, time-consuming technique of scoring one surface of the sheet along a desired line of cut and then applying a bending force about the score line. This well-known procedure is especially tedious and costly when trimming the bulb edge of relatively thick glass sheets having thicknesses of ¾ inch or greater because at least two, and sometimes three, successive trim cuts inwardly of such edge must be made in order to achieve a final satisfactory edge. Moreover, a finishing operation, such as belt seaming for example, is sometimes required for certain commercial applications.

Thermal glass cutting involves the application of heat to a surface of the glass along the intended line of cut to produce a thermal differential line through the thickness of the sheet and along which the compressive stresses adjacent the surface are decreased while the tensile stresses within the central region or core of the glass sheet are increased until reaching a level at which the glass will fracture along the thermal differential line. The most familiar of the various proposals for thermally severing glass involves the application of radiant heat along the intended line of cut from a non-contact thermal source spaced from the glass sheet surface. Also, one edge of the glass sheet is nicked to provide an edge score in alignment with the intended line of cut. As a practical matter, however, it has been found that the foregoing method of thermally severing glass is not always reliable in producing true linear cuts. It has been theorized that the reason for this resides in the fact that the radiated heat emanating from the source converges and enters the glass surface along the intended line of cut and then diverges as it migrates inwardly through the glass thickness. The progressively widening heated area creates at the tension layer, a heat band of substantially greater lateral extent than the thermal differential line. This can cause the glass to fracture uncontrollably in a meandering path along such band. Moreover, when attempting to make straight linear cuts parallel to the trim side of the blank where the desired line of cut is located inwardly of, or offset from, the centerline of the blank sheet, the cut has a tendency to run in an arcuate path toward the trim side to produce an arcuately curved or bowed edge projecting toward the trim side.

SUMMARY OF THE INVENTION

Accordingly, it is a primary object of the present invention to obviate the above-noted disadvantages by providing a new and improved method of thermally cutting glass by the application of localized, conductive heat to a glass surface along a desired line of cut to effect a fracture therealong.

It is another object of this invention to provide a new and useful thermal cutting apparatus having surface contact, heat conducting means in substantial contact throughout with the underlying glass along a desired line of cut.

It is a further object of this invention to provide means for maintaining the foregoing heat conducting means in substantial continuous contact with the underlying glass sheet throughout the length of the desired line of cut.

The foregoing and other objects, advantages, and characterizing features of the present invention will become clearly apparent from the ensuing detailed description thereof considered in conjunction with the accompanying drawings wherein like reference characters denote like parts throughout the various views.

DESCRIPTION OF THE PREFERRED EMBODIMENT

Figure 1:
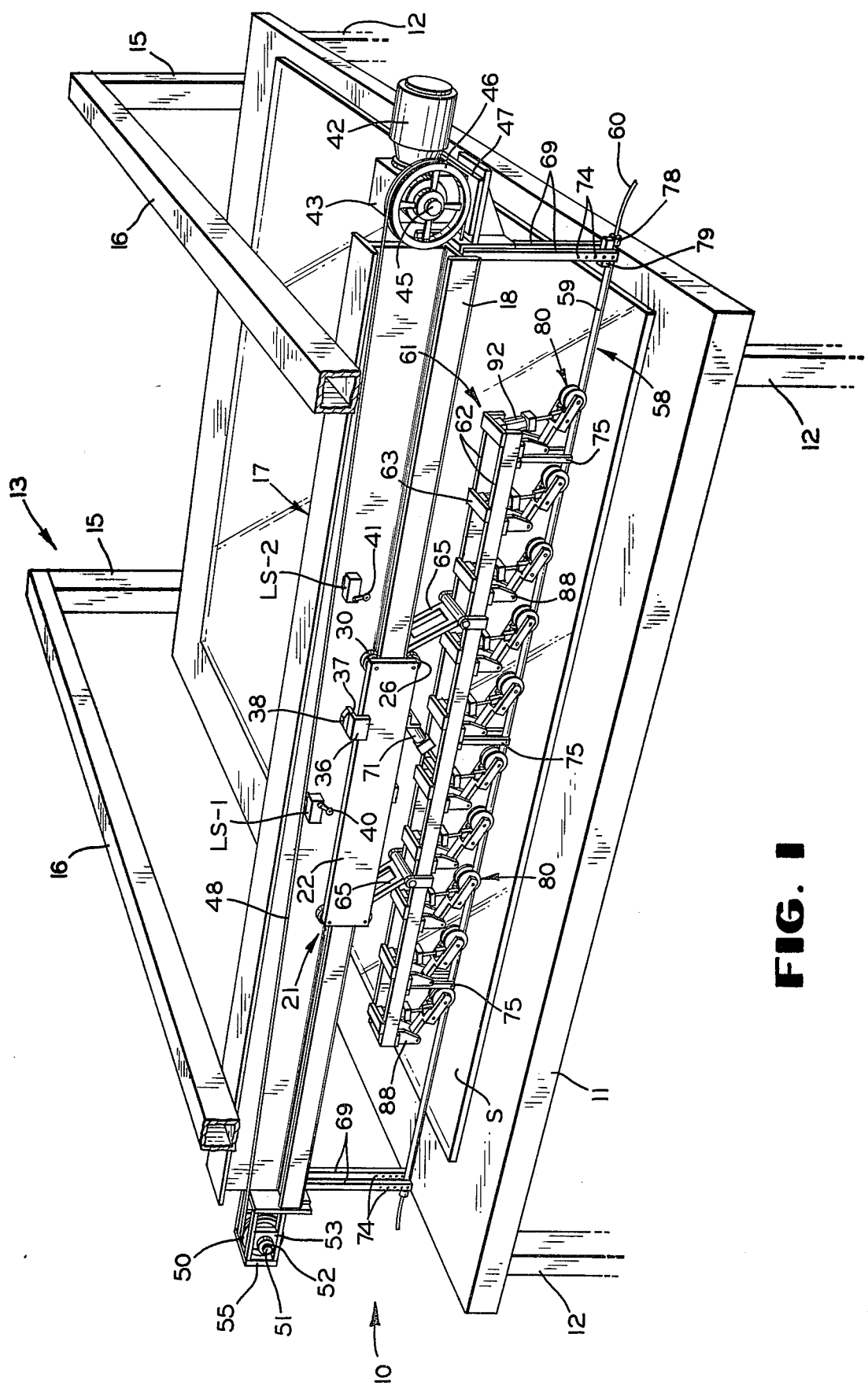
FIG. 1 is a perspective view of a thermal cutting apparatus embodying the novel features of the present invention.

Referring now in detail to the illustrated embodiment depicted in the accompanying drawings for carrying out this invention, there is shown in FIG. 1 a glass cutting apparatus, comprehensively designated 10, mounted above a glass supporting table 11 suitably supported on a plurality of legs 12. The cutting apparatus 10 is mounted on a structural frame 13 including a pair of spaced, upstanding columns 15 on each side of table 11 (only one pair being shown in FIG. 1), each pair being laterally aligned with the other. Columns 15 extend upwardly above table 11 and are tied together at their upper ends by horizontally extending hollow beams 16 secured at their opposite ends to the aligned columns 15 to form a rigid, box-like structure. An I-beam 17 is welded or otherwise fixedly secured to the bottom sides of horizontal beams 16 and extends across the table 11 in vertical spaced, but parallel, relation to the upper surface of table 11. A pair of parallel guide rails 18 (FIG. 3) are rigidly secured to the opposite ends of the lower flange 20 of I-beam 17 and extend lengthwise thereof for supporting a carriage 21 adapted to be reciprocated horizontally therealong.

Figure 2:
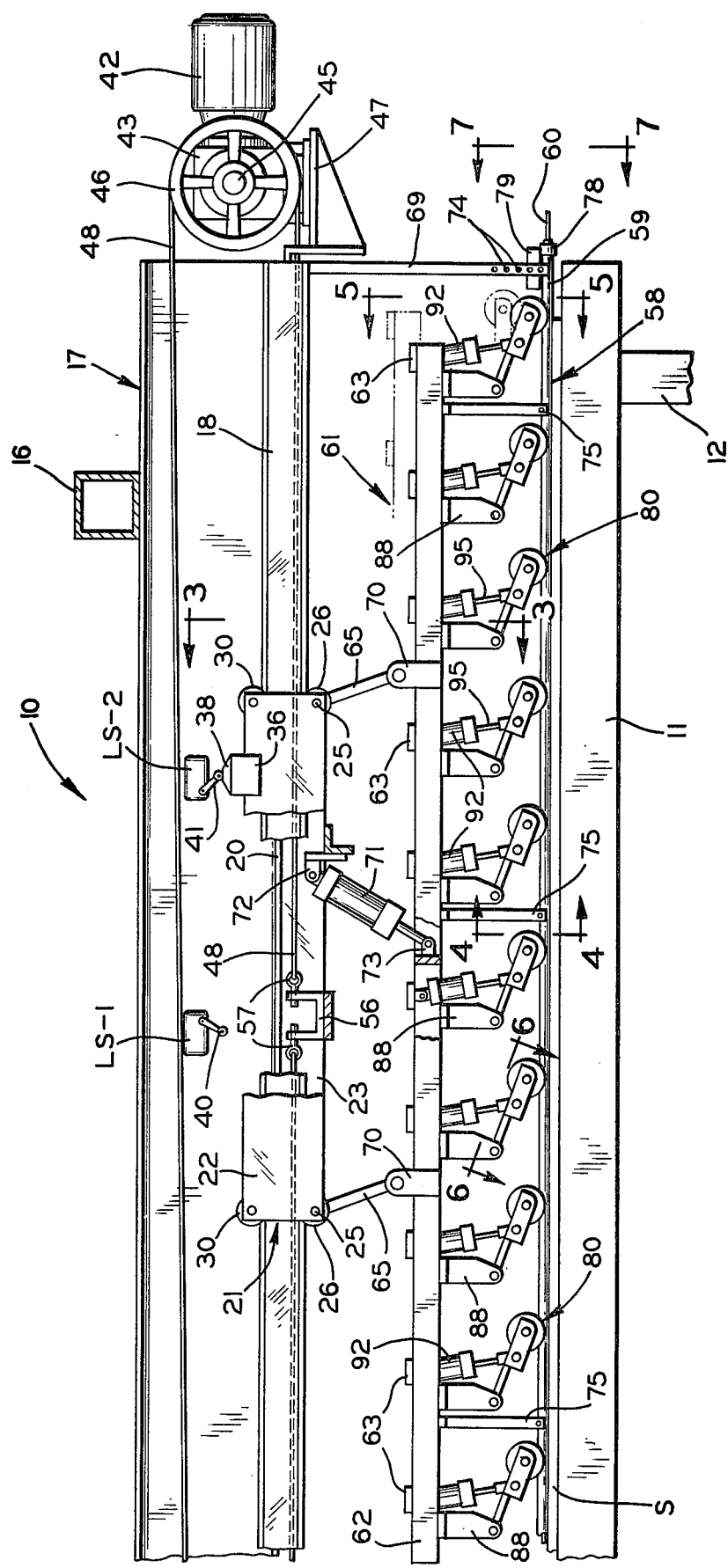
FIG. 2 is a fragmentary front elevational view, on an enlarged scale, of the apparatus shown in FIG. 1.
Figure 3:
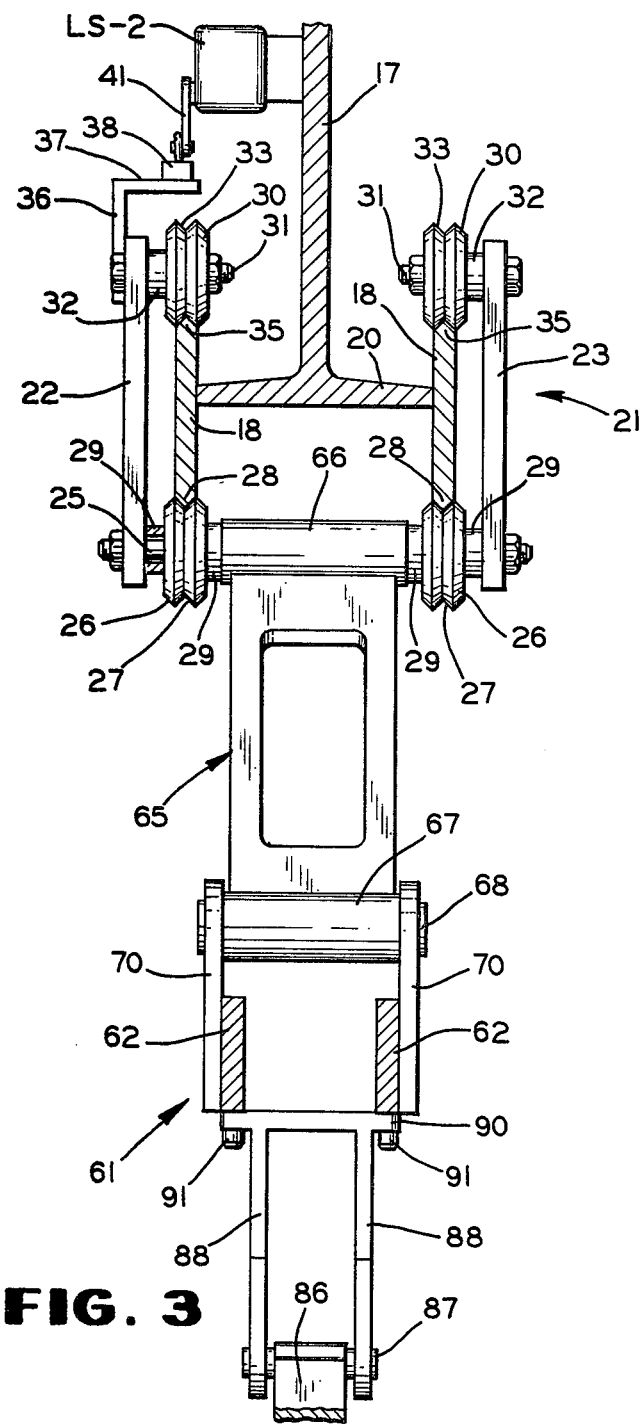
FIG. 3 is a vertical sectional view, on an enlarged scale, taken along the line 3–3 of FIG. 2.

As best shown in FIGS. 2 and 3, the carriage 21 comprises a pair of laterally spaced, upright plates 22 and 23 connected together adjacent their lower ends by a pair of longitudinally spaced tie rods 25 located adjacent the opposite ends of the plates. Each tie rod 25 is provided with a pair of laterally spaced lower rollers 26 suitably journalled thereon and having generally V-shaped grooves 27 extending circumferentially thereabout engageable with the complementary shaped lower edges 28 of guide rails 18. Suitable spacers 29 are mounted on tie rod 25 on opposite sides of rollers 26 to maintain the same in the desired lateral position in registry with guide rails 18.

A pair of upper rollers 30 are mounted on opposite ends of plates 22 and 23 adjacent the upper edges thereof in vertical alignment with the lower rollers 26. The rollers 30 are connected to their respective plates by bolt fasteners 31 and are spaced inwardly therefrom by suitable spacers 32. Rollers 30 also are provided with V-shaped circumferential grooves 33 engageable with and adapted to ride on the complementary shaped upper edges 35 of guide rails 18.

An inverted L-shaped bracket 36 is mounted on plate 22 and is provided with a horizontal leg 37 for mounting thereon an actuator 38 adapted to engage the actuating levers 40 and 41 of a pair of longitudinally spaced limit switches LS-1 and LS-2 mounted on I-beam 17 for a purpose hereinafter explained.

The means for reciprocating the carriage 21 includes an electric reversible motor 42 connected to a suitable source of electrical power (not shown) and operatively connected, via gear reduction box 43, to a drive shaft 45 having a drive pulley 46 rigidly secured thereto. The drive thus far described is mounted on a platform 47 rigidly secured to one end of I-beam 17. A drive cable 48 is trained about the drive pulley 46 and about an idler pulley 50 (FIG. 1) mounted on a shaft 51 suitably journalled for rotation in spaced bearings 52 mounted on upright supports 53 of a box-like frame 55 secured to the other end of I-beam 17. The drive cable 48 is anchored at its ends to carriage 21 by means of a U-shaped anchor block 56 (FIG. 2). Each end of the cable 48 is secured to an eye bolt 57 adjustably threaded into a tapped bore formed in one leg of the block 56, in turn welded or otherwise fixedly secured to the carriage 21.

The surface contact, conductive heating means, generally designated 58 and hereinafter more fully explained, is indirectly suspended from the carriage 21 by means of an intermediate lift assembly, generally designated 61. The lift 61 comprises a pair of laterally spaced, longitudinal members 62 connected together by means of a plurality of relatively short cross members 63. Lift 61 is suspended from carriage 21 at two longitudinally spaced points for generally vertical - arcuate movement relative thereto by means of longitudinally spaced, pivotal brackets 65, each of which is formed with an upper collar 66 (FIG. 3) pivotably mounted about the tie rod 25 of carriage 21 and a lower collar 67 pivotably mounted on a shaft 68 secured at its opposite ends in a pair of laterally spaced lugs 70 projecting upwardly from the longitudinal members 62 of lift 61. The means for raising and lowering the lift 61 relative to the carriage 21 includes a fluid actuator 71 pivotally mounted at its head end to a lug 72 rigidly secured to carriage 21 and at its rod end to a lug 73 rigidly secured to lift 61.

It has been found that in order to obtain a smooth, straight line cut through a sheet of glass, especially a relatively thick glass sheet of ⅜ inch thickness of greater, it is important to localize or confine the applied heat to the above-mentioned thermal differential line as the heat migrates inwardly through the glass thickness. This is difficult to achieve repeatedly by non-contact thermal severing techniques involving thermal radiation for example, because the radiated heat diverges outwardly as it migrates inwardly of the glass surface and is absorbed on interior regions of the glass extending laterally outwardly in opposite directions from the thermal differential line or desired line of cut. This creates a band-like area of heated glass at the tension layer having a lateral extent greater than the desired line of cut and often causes the glass sheet to fracture or split apart uncontrollably in a somewhat meandering path. Moreover, when thermally severing a glass sheet by radiation along a line of cut displaced from the centerline of the sheet, there is a tendency for the cut to bow or arch in the direction of the trim side of the sheet because of the unbalanced temperature profile on opposite sides of the desired line of cut.

It has been found that the most efficient expedient for consistently producing a true linear, thermal cut is to apply surface contact, conductive heat therealong with continuous glass contact along the entire line of cut. To this end and, in accordance with the principles of this invention, the heat conducting means 58 is formed of an elongated, cylindrical hollow pipe or rod 59 adapted to engage the non-scored upper surface of the glass sheet along the desired line of cut and transmit heat thereto. The cylindrical peripheral surface of the rod 59 provides line contact only with the glass surface at the desired line of cut and confines the applied heat thereto. Rod 59 should be at least as long as the intended line of cut, and preferably longer. Cutting trials employing rods formed of thick walled, stainless steel tubing, as well as thick walled, galvanized steel tubing have been successful. The conductor 59 can be uniformly heated up to the desired temperature by an elongated, electrical resistance heating element 60, such as the electrical heating unit commercially available under the trademark "Calrod" for example, extending through the rod 59 and projecting outwardly from the opposite ends thereof for connection to a suitable electrical power source (not shown).

The conductor rod 59 is suspended from lift 61 by a series of paired lift arms 75 depending downwardly from the lift longitudinal members 62 at three equally, longitudinally spaced points therealong. The arms 75 of each pair are provided with lift fingers 76 (FIG. 4) in the form of setscrews threaded through their respective arms at a downwardly directed angle relative to a true horizontal in a converging relation and have tapered end portions 77 engageable with opposite sides of the conductor rod 59 below the vertical midpoint thereof. The conductor rod 59 rests and is supported on these tapered end portions 77 in the elevated position of lift 61. When lowering the lift to place the conductor rod 59 on the glass sheet, rod 59 engages the upper surface of the sheet S before the lift reaches the end of its downstroke, causing the lift fingers 76 to be disengaged from the rod 59 so as to provide the necessary clearance for the reciprocating pressure applying rollers, hereinafter more fully described.

Means are provided for vertically guiding the conductor rod 59 when raised or lowered. Such means comprise a pair of conductor rod guides 69 provided at the opposite ends of table 11 and depending downwardly from the I-beam 17 for receiving the opposite ends of the conductor rod 59. The guides 69 are provided with a plurality of vertically spaced, laterally aligned openings 74 through which suitable pins (not shown) can be inserted for supporting the opposite ends of conductor rod 59 at rest in an elevated position above table 11.

Figure 7:
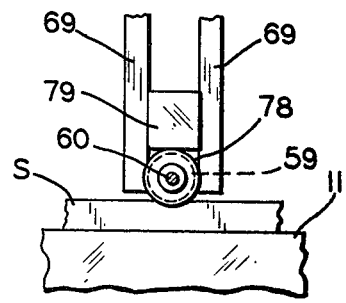
FIG. 7 is a fragmentary end elevational view, on an enlarged scale, looking in the direction of arrows 7—7 in FIG. 2, illustrating the guide means for the conductor rod embodied in the apparatus of this invention.

In order to preclude lateral rolling movement of the rod 59 when placed on the glass surface, a collar 78 (FIG. 7) is secured to at least one end of rod 59 and is provided with a flatsided block 79 welded or otherwise fixedly secured to collar 78 and which fits snugly between guides 69 for sliding movement relative thereto.

Placing the heated conductor rod 59 on the upper surface of the glass sheet S coincident with the desired line of cut transmits heat directly to the glass along the length of this desired line of cut to produce a thermal differential line inwardly through the thickness of the sheet, the propagating heat transfer being substantially confined to the thermal differential line extending perpendicularly to the opposite surfaces of the sheet. As a result of this applied conductive heat, the surface of the glass along such line expands somewhat to relieve or decrease the compressive stresses on and immediately below the glass surface while the tension layer along the thermal differential line attempts to contract in an effort to counteract such expansion and consequently increases the tensile stresses. A continued increase in tensile stresses, coupled with the initial damage imparted to the edge of the sheet by scoring or nicking, causes the intermediate tension layer to split along the entire length of the thermal differential line, the split being propagated perpendicularly through the compression layers to both opposite surfaces. Once started, the split or fracture is effected within a fraction of a second to complete the cut. It has been found that substantially continuous contact of the conductor rod with the glass surface along the full length of the desired cut is necessary to effect a true linear cut yielding smooth and even severed edges therealong.

While relatively short linear cuts, say up to 48 inches for example, can be satisfactorily made by the heat conducting technique described above, problems are encountered in making longer cuts in a true linear path. This is due to the interruption of contact between the rod and the glass surface caused by the warpage or bowing of portions of the conductor rod away from the glass surface as a result of thermal variations therein caused by engagement of the heated rod with the relatively cool surface of the glass. Attempts to overcome this warpage by employing elongated, rod abutting press members and the like without imparting excessive physical stresses to the sheet have not been successful because of the heat transfer to such members causing them also to warp along with the rod. On the other hand, applying the necessary physical force to counteract this warpage induces physical stresses in the glass which can promote chipping or uncontrolled breakage. Nor would the application of pressure to the rod at fixed, spaced points solve the problem because those portions of the rod between the pressure points would bow sufficiently to interrupt the necessary surface contact with the glass.

In order to preclude such warpage, means in accord with this invention are provided for maintaining the conductor rod 59 in substantially continuous contact throughout with the glass sheet surface without inducing physical stresses in the glass. To this end, such means comprise a plurality of equally spaced, longitudinally aligned rollers 80 adapted to bear against the conductor rod 59 and rollable thereon to apply a moderate, uniform pressure therealong. Since all of the rollers 80 and their mountings are identical in construction and operable in the same manner, it is believed that a detailed description of only one will suffice, it being appreciated that the same reference characters will be applied to identical parts.

Figure 5:
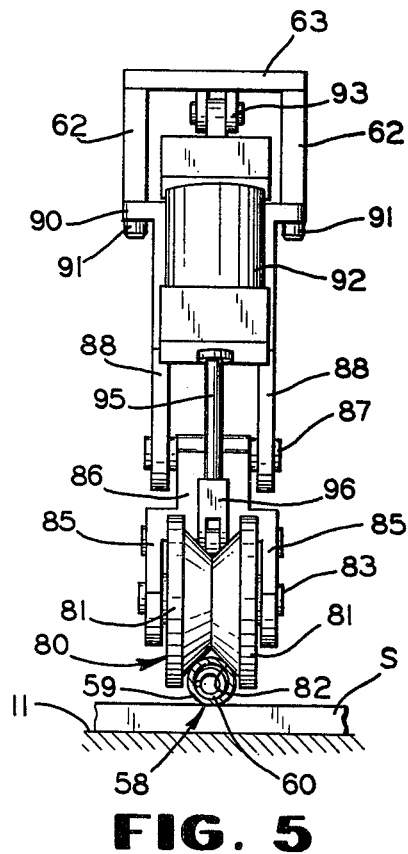
FIG. 5 is an end elevation view, on an enlarged scale, looking in the direction of arrows 5—5 of FIG. 2.
Figure 6:
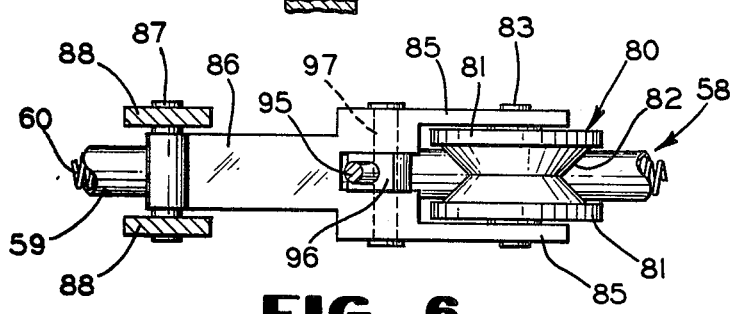
FIG. 6 is a plan view, partly in section, on an enlarged scale, looking in the direction of arrows 6—6 in FIG. 2.

With reference to FIGS. 3, 5 and 6, each roller 80 comprises a body portion provided with enlarged diameter flanges 81 at the opposite ends thereof and having a peripheral V-shaped groove 82 for receiving the conductor rod 59. The V-shaped configuration of groove 82 permits the use of a wide variety of differently sized conductor rods without the necessity of changing rollers. Each roller 80 is journalled on a shaft 83 mounted at its opposite ends in the bifurcations 85 of a yoke member 86, in turn pivotably mounted on a shaft 87 secured at its opposite ends in the depending legs 88 of an inverted U-shaped bracket 90 secured, as by fasteners 91, to the longitudinal members 62 of lift 61.

Means are provided for swinging each roller 80 between an operative position bearing against conductor rod 59 and an elevated, inoperative position shown in phantom at the right in FIG. 2. Such means comprise a fluid cylinder 92 connected, as shown at 93 in FIG. 5, to a cross member 63 provided with the usual piston rod 95 pivotably connected, as shown at 96 in FIG. 6, to a shaft 97 mounted in yoke member 86. Cylinders 92 are designed to apply only a moderate amount of pressure, on the order of approximately 10 to 30 psi, and preferably 15 psi for example, to counteract the tendency for the rod to warp or bow away from the glass surface.

Figure 4:
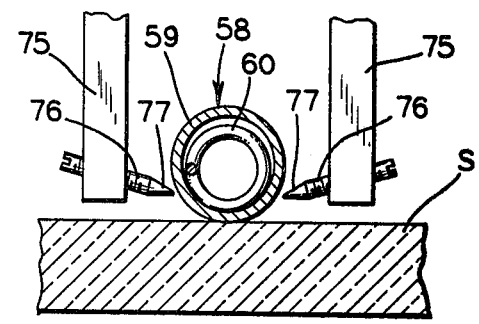
FIG. 4 is a vertical sectional view, on an enlarged scale, taken along the line 4—4 of FIG. 2.

The mode of operation of the apparatus of this invention in severing from a blank plate or sheet S of glass an elongated, relatively narrow strip, such as can be employed as a stabilizer in architectural constructions for example, is as follows:

With the heating element 60 energized to maintain the conductor rod 59 at the desired elevated temperature and the latter in an elevated position above the surface of table 11, an enlarged sheet S is placed on the upper flat surface of table 11 with the desired line of cut vertically aligned with the conductor rod 59. The sheet S may be moved relative to the cutting apparatus for proper positioning or alternatively, the I-beam 17 can be mounted on horizontal beams 16 by means of a trolley-track arrangement (not shown) for horizontal movement relative to beams 16 to position conductor rod 59 in vertical registry with the desired line of cut. In either event, once the rod 59 is aligned with the desired line of cut, lift 61 is lowered by extending the piston rod of cylinder 71 to bring conductor rod 59 into engagement with the glass sheet surface coincident with the desired line of cut. The lift 61 continues to descend until the lift fingers 76 are lowered out of engagement with the rod 59, as shown in FIG. 4, to provide clearance for the reciprocating rollers 80 when lowered. The series of cylinders 92 are then actuated to extend their respective piston rods 95 to bring the rollers 80 into bearing contact with the upper portion of conductor rod 59. It should be appreciated that only a moderate pressure, on the order of about 15 psi for example, is applied to the rollers to prevent undesirable physical stress build-up in the glass. An edge score is applied to the edge of the large sheet in alignment with the desired line of cut to initially damage or weaken slightly the tension layer of the sheet S.

When placed on the glass surface, the heated conductor rod 59 heats, via conduction, the glass sheet immediately adjacent or underlying the conductor rod along the desired line of cut to produce a thermal differential line through the sheet. The conductive heat applied along this thermal differential line relieves some of the compressive stresses in the compression layer as it migrates inwardly through the sheet thickness while proportionately increasing the tensile stresses in the intermediate tension layer. The tensile stresses increase until they reach a level which, when assisted by the initially weakened scored edge, create a split or fracture in the tension layer along the thermal differential line. This split or cut is propagated outwardly through the compression layers to the opposite surfaces of the glass sheet along the entire desired line of cut, leaving smooth and even severed edges throughout. Once the fracture begins, the cut is completed in a fraction of a second.

When the conductor rod 59 is placed on the glass surface coincident with the desired line of cut, the reversible motor 42 is energized to rotate the pulley 46 and move carriage 21 axially and thereby the rollers 80 longitudinally relative to conductor rod 59. As the carriage moves in this first direction, toward the right as viewed in FIG. 1, and approaches the end of its stroke, the actuator 38 engages the lever 41 of limit switch LS-2 to complete a circuit, reversing the polarity and thereby the rotation of motor 42 and returning carriage 21 in the opposite or second direction leftwardly along guide rails 18. As the carriage 21 advances in this second direction and reaches the opposite end of its stroke, actuator 38 engages the lever 40 of LS-1 to complete another circuit, again reversing the polarity and rotation of motor 42 to change the movement of carriage 21 in the opposite or first direction. The continued reciprocating rolling action of rollers 80 against conductor rod 59 imparts a uniform moderate pressure thereto throughout its effective length to counteract and overcome the tendency of the rod 59 to bow or warp upwardly away from the glass and thereby maintain the rod in substantially continuous contact with the underlying glass sheet. This rolling action tends to iron or flatten out any irregularities in the rod and resists the tendency of portions thereof to buckle upwardly out of contact with the glass surface.

The carriage travel in either direction and the spacing between adjacent rollers 80 is such that each roller 80 has a stroke overlapping the end stroke of the preceding roller 80 to assure positive engagement with at least that length of rod 59 contacting the glass surface. As shown in FIG. 2, the outermost roller at each end has an end stroke extending past the edge of the glass sheet. Satisfactory rod-glass contact was achieved by spacing the rollers at 12 inch centers with a carriage stroke range of from about 20 inches to 30 inches.

Excellent results have been obtained in cutting strips from ¾ inch thick, annealed glass having a length of 162 inches using a ¾ inch OD conductor rod heated to a temperature of about 700° F. The heated rod was left in contact with the sheet until the cuts were completed, the total time of rod-glass contact ranging from about 15 seconds to 40 seconds, the time varying in accordance with the quality of the anneal imparted to the glass. It was found that as the quality of the anneal increased, the shorter the duration of rod contact time required to complete the cut. The severed strips exhibited straight, smooth and even edges without the necessity of further finishing. While preferably the rod was formed of stainless steel piping, it should be appreciated that the conductor rod can be formed of any material having high heat conductivity properties with an OD from about ½ inch to 1½ inches. Also, the rod can be heated up to a temperature varying between 300° F. to 1100° F. as determined by the thickness of the glass. Generally, an increase in glass thickness requires a decrease in applied heat. For example, it was found that excellent results were obtained on ¾ inch glass by heating the conductor rod to 700° F., whereas a temperature of only 600° F. yields good results with 1 inch thick glass. It should be appreciated that any number of rollers can be employed as dictated by the length of cut desired. Also, the spacing between rollers, as well as their length of stroke as determined by the carriage, may vary widely within the purview of this invention.

From the foregoing, it is apparent that the objects of the present invention have been fully accomplished. As a result of this invention, a new and useful cutting apparatus is provided for effecting successful elongated thermal cuts in relatively thick glass sheets yielding edges that are smooth and even and that minimizes, if not completely eliminates, further finishing operations. By the provision of an elongated heat conducting rod, the applied conductive heat is localized or concentrated at the desired line of cut in the underlying glass to better control cutting and inhibit the formation of ragged and irregular edges. The provision of a series of equally spaced pressure members or rollers reciprocable back and forth along the rod under moderate pressure assures substantially continuous glass contact and overcomes the tendency of the elongated rod to warp or bow away from the glass surface when making long linear cuts, on the order of 48 inches to 200 inches for example.

It is to be understood that the form of the invention herewith shown and described is to be taken as an illustrative embodiment of the same, and that various changes in the shape, size and arrangement of parts, as well as various procedural changes, may be resorted to without departing from the spirit of the invention.

We claim:

1. A method of cutting relatively thick glass along a desired straight line of cut comprising: providing an elongated hollow heat conductor in the form of a cylindrical rod, placing said heat conductor on an at least one non-scored surface of a relatively thick glass sheet to provide linear line contact therewith coincident with and along a desired straight line of cut, applying heat uniformly to said conductor, transmitting said heat through said conductor via said linear line contact onto said glass surface along said desired straight line of cut, and maintaining continuous linear line contact between said conductor and said non-scored glass surface throughout the entire length of said desired line of cut by applying a moderate, uniform pressure to said conductor with a series of longitudinally aligned rollers reciprocably movable along said conductor in bearing engagement thereagainst to concentrate said heat along said desired line of cut and sever said glass sheet into portions having smooth and even severed edges through and which are truly perpendicular to the major surfaces of the severed glass portions.

2. A method of cutting glass according to claim 1, including scoring the edge of the sheet perpendicularly to said non-scored surface at one end of the desired line of cut.

3. A method of cutting glass according to claim 2, wherein said edge is scored prior to applying heat to said conductor.

4. A method of cutting glass according to claim 1, wherein said applied conductive heat is of a magnitude and for a duration adequate to heat the sheet inwardly through the thickness thereof along said desired line of cut to a temperature causing said sheet to fracture along said desired line of cut.

* * * * *

UNITED STATES PATENT AND TRADEMARK OFFICE
CERTIFICATE OF CORRECTION

PATENT NO. : 4,109,840
DATED : August 29, 1978
INVENTOR(S) : Waldemar W. Oelke et al It is certified that error appears in the above-identified patent and that said Letters Patent are hereby corrected as shown below:

Col. 2, line 24, "elevation" should be --elevational--
Col. 3, line 57, "of" (2nd occurrence) should be --or--
Col. 6, line 17, after "63" insert --and--
Col. 8 line 52, "through" should be --throughout--

Signed and Sealed this

Thirteenth Day of February 1979

[SEAL]

Attest:

RUTH C. MASON
*Attesting Officer*

DONALD W. BANNER
*Commissioner of Patents and Trademarks*